Jan. 23, 1962   R. J. SIGLER   3,017,709
TREE OR SHRUB REMOVER
Filed June 5, 1959   4 Sheets-Sheet 1
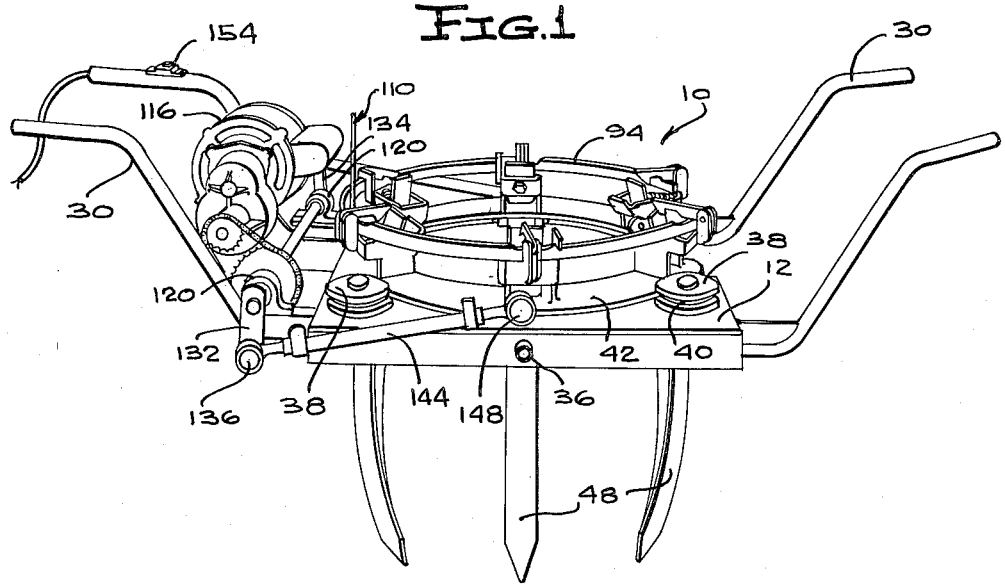
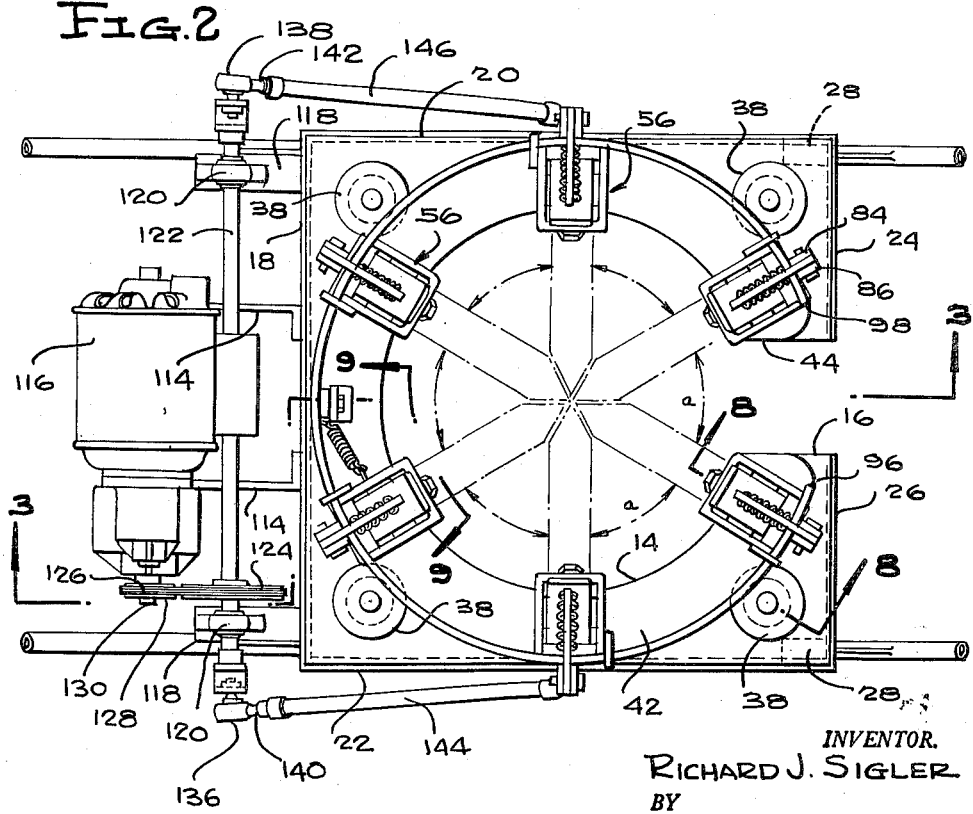
INVENTOR.
RICHARD J. SIGLER
BY
McMorrow, Berman & Davidson
ATTORNEYS

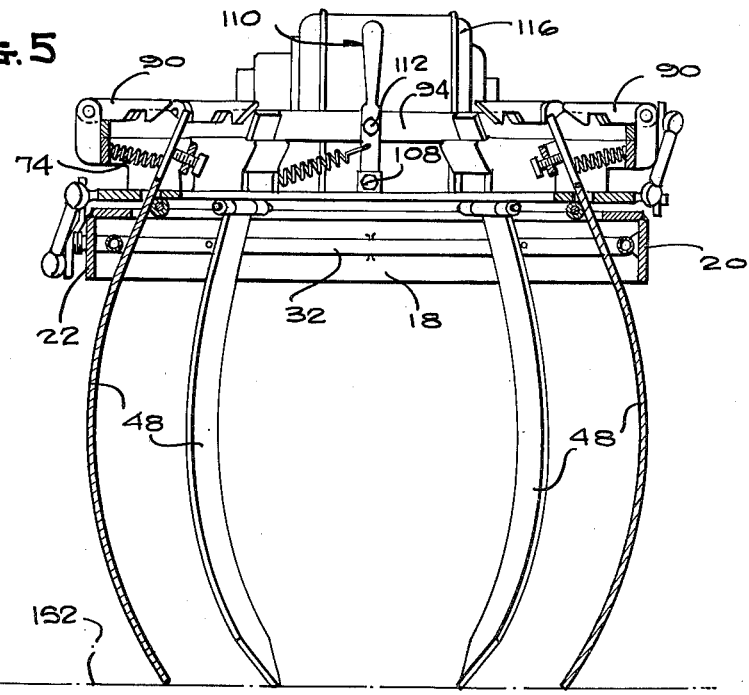
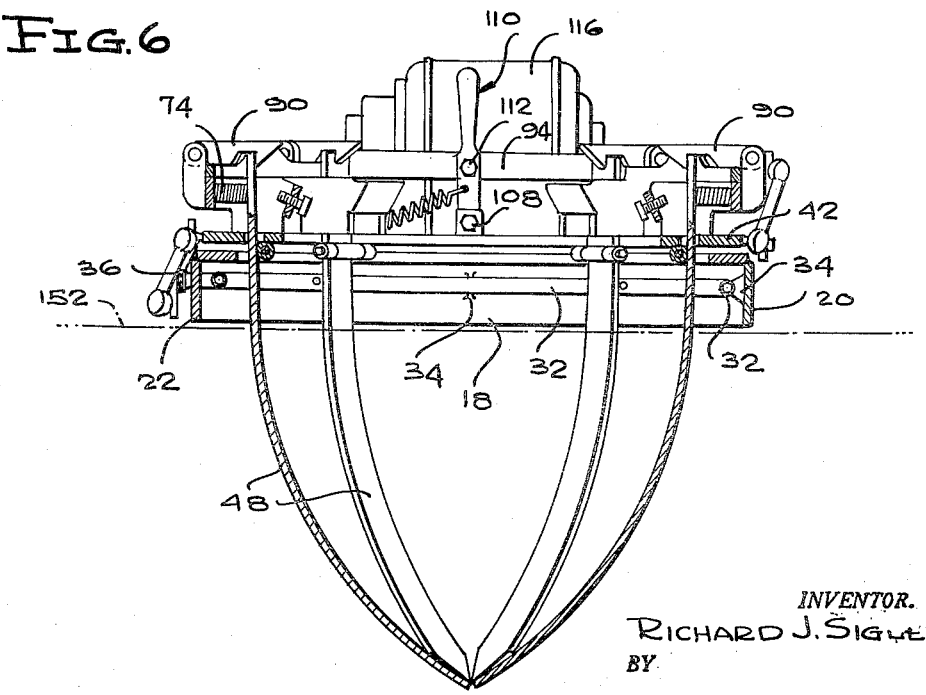

Jan. 23, 1962 R. J. SIGLER 3,017,709
TREE OR SHRUB REMOVER
Filed June 5, 1959 4 Sheets-Sheet 4
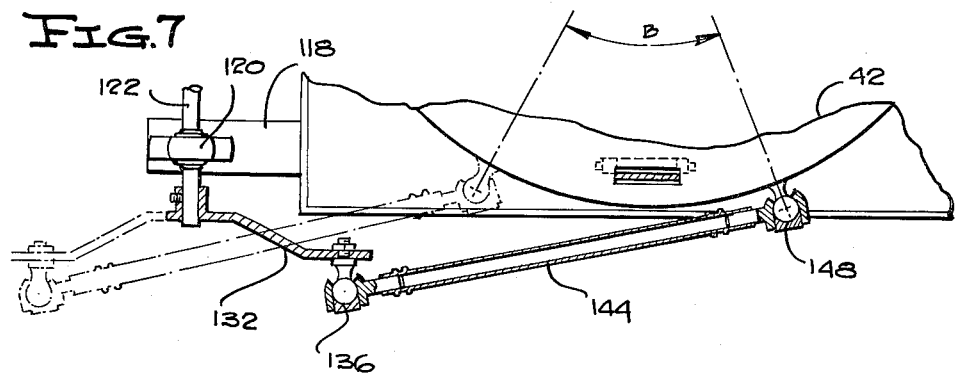
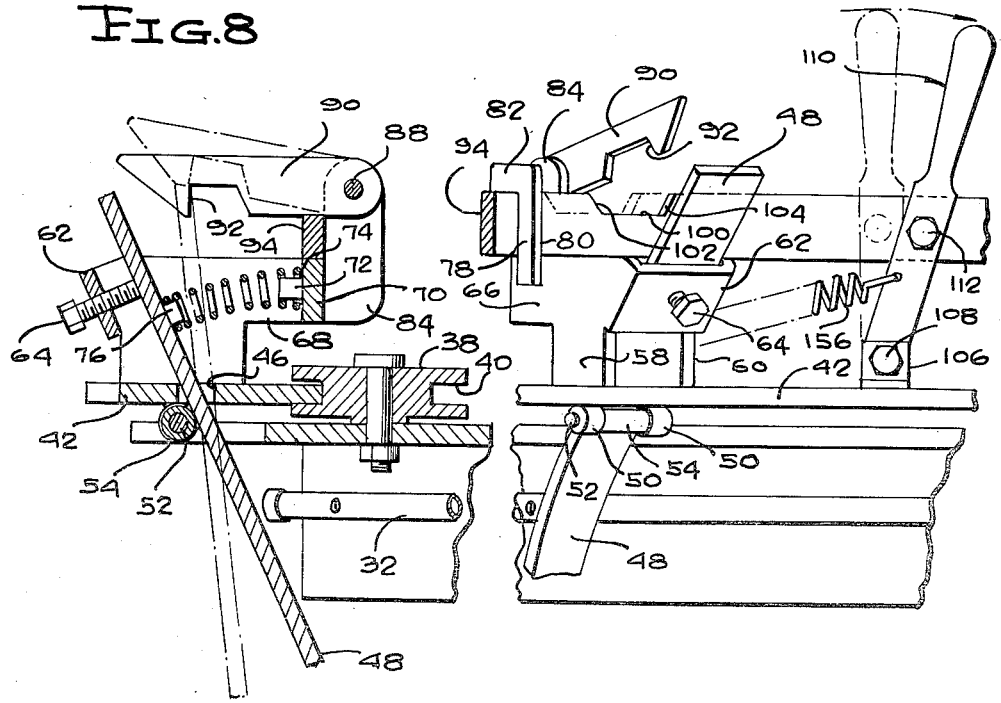
INVENTOR.
RICHARD J. SIGLER
BY
McMorrow, Berman + Davidson
ATTORNEYS

United States Patent Office 3,017,709
Patented Jan. 23, 1962

3,017,709
TREE OR SHRUB REMOVER
Richard J. Sigler, Houston, Tex., assignor, by mesne assignments, to Reed Roller Bit Company, Houston, Tex., a corporation of Texas
Filed June 5, 1959, Ser. No. 818,425
9 Claims. (Cl. 37—2)

This invention relates to a machine for digging and removing from the earth small trees or shrubs for transplantation purposes.

One of the primary objects of this invention is to provide small tree or shrub digging equipment which may be manually operable by no more than two operators.

Another object of this invention is to provide equipment of the type referred to supra which is operable to dig up small trees and shrubs for transportation purposes, the operation being accomplished efficiently and without undue expenditure of time.

Another object of this invention is to provide a tree digging or shrub removing device which employs a minimum number of operating parts, and a machine which is safe to operate.

Still another object of this invention is to provide a tree digging or shrub remover which is positive in operation.

This invention contemplates, as a still further object thereof, the provision of a tree digging or shrub removing machine which is non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 1 is a perspective view of a tree digging or shrub remover constructed in accordance with this invention;

FIGURE 2 is a top plan view of the machine shown in FIGURE 1;

FIGURE 5 is a detail cross-sectional view taken substantially on the vertical plane of line 5—5 of FIGURE 3, looking in the direction of the arrows, FIGURE 5 showing cutting blades disposed in their expanded positions;

FIGURE 6 is a cross-sectional view similar to FIGURE 5, FIGURE 6 illustrating the relative positions of certain components of this invention when the cutting blades are in their closed positions;

FIGURE 7 is an enlarged detail fragmentary cross-sectional view illustrating the mechanical movement employed for operating the machine;

FIGURE 8 is an enlarged fragmentary detail cross-sectional view, FIGURE 8 being taken substantially on the line 8—8 of FIGURE 2, looking in the direction of the arrows; and, FIGURE 9 is a fragmentary side elevational view taken substantially on the arcuate plane of line 9—9 of FIGURE 2, looking in the direction of the arrows.

Figure 3:
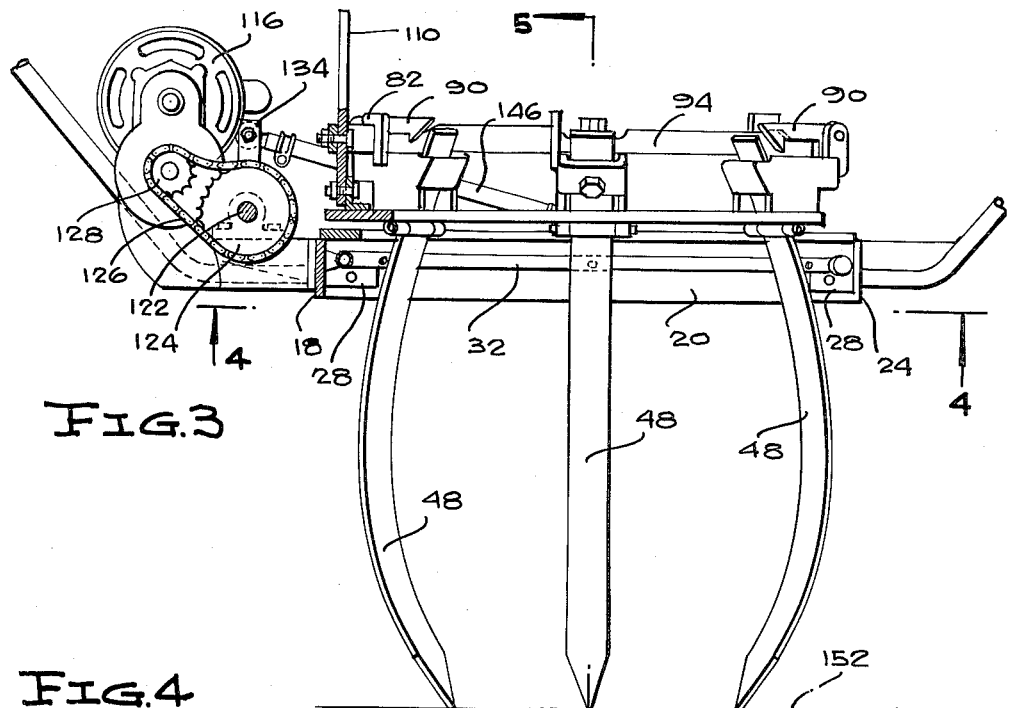
FIGURE 3 is a detail cross-sectional view, partly in side elevation, FIGURE 3 being taken substantially on the line 3—3 of FIGURE 2, looking in the direction of the arrows.

Referring now more specifically to the drawings, reference numeral 10 designates, in general, a tree digging or shrub remover constructed in accordance with the teachings of this invention. As disclosed in the several figures of the drawings, the machine 10 is seen to comprise a substantially rectangular platform 12, having a central aperture 14 which opens through one side of the platform 12 through a slot 16. The platform 12 is provided with a plurality of flanges 18, 20 and 22 at the uninterrupted sides thereof and a pair of depending flanges 24, 26 which project from the platform 12 at the slotted side thereof. The flanges 24, 26 are disposed in spaced parallel and confronting relation relative to each other. To the corners of each adjacent pair of flanges are rigidly secured, respectively, a plurality of sockets 28 which are adapted to receive therein one end of a plurality of handle members 30. To the inner sides of the flanges 18, 20 and 22 is secured a hollow tubular substantially circular spray member 32 by means of bosses 34. A connector element 36 extends through the flange 22 and connects with the spray member 32. The connector element 36 is adapted for connection with a conventional hose (not shown) to serve a function to be described.

Rotatably supported on the platform 12, adjacent each corner thereof is a support wheel 38 having a centrally located circumferential groove 40. The grooves 40 of the support wheels 38 are adapted to receive therein the external marginal edge of a substantially annular ring 42 which is slotted at 44 for alignment with the slot 16 formed in the platform 12.

At a plurality of circumferentially spaced intervals, the annular ring 42 is formed with transversely extending substantially rectangular openings 46 (see FIGURE 8) through which extend arcuately shaped, axially elongated digging blades 48. As is seen in FIGURES 5, 6 and 8, a pair of hinge barrels 50 are fixedly secured to the underside of the annular ring 42 adjacent each end of the slots 44. The hinge barrels 50 support a pivot pin 52 and between each adjacent pair of barrels is mounted a sleeve 54, the latter being rigidly secured to the digging blades 48, as by welding, adjacent one end thereof. Thus, the blades 48 are pivotally connected on the annular ring 42.

Reference numeral 56 designates, in general, a housing having a pair of opposed upper and lower ends. The housing 56 is seen to include a pair of upright standards 58, 60 rigidly secured to the annular ring 42 and projecting upwardly therefrom adjacent each of the ends of the slots 46. The standards 58, 60 are spanned by an inner end wall 62 which is formed integral therewith and is provided with a centrally located adjusting screw 64. As is seen in the figures, the adjusting screw 64 is placed into proximity with one end of the blades 48. The standards 58, 60, adjacent their respective upper ends are formed with outwardly projecting flanges 66, 68 which are integrally connected together by means of an outward end wall 70. The outer end wall 70 carries an inwardly projecting boss 72 which serves as a spring seat for one end of a helicoidal spring 74, the other end of which surrounds a spring guide 76 rigidly secured to the blades 48 adjacent the aforementioned one end thereof. The spring 74 is under compression and normally tends to bias the blades 48 for movement away from each other. In this position, the upper ends of the blades 48 are urged into contact with the adjustment screws 64.

Fixedly secured to each of the flnages 66 is the leg portion 78 of an inverted substantially L-shaped hold-down guide 80 having its respective foot portion 82 facing outwardly of the annular ring 42. Rigidly secured to the outer end walls 70 are a pair of spaced brackets 84, 86, each pair of brackets supporting therebetween the opposed ends of pivot pins 88. Between each pair of brackets 84, 86 and pivotally mounted on the pivot pins 88 is one end of a plurality of latch members 90 and the free ends of which are provided with downwardly opening hooks 92.

Slidably mounted across the upper ends of the flanges 66, 68 and the outer end wall 70 is a resilient circular band 94 which is positioned between adjacent sides of the leg portions 78 and the brackets 84, 86. As is clearly seen in FIGURES 8 and 9, the resilient circular band 94 engages below the latch members 90. The band 94 is provided with a pair of ends 96, 98 which are disposed on opposite sides of the slots 16, 44. As is clearly seen in FIGURES 1 and 9, the band 94 is formed with upwardly opening recesses 100 which normally receive the latches 90 proximate thereto therewithin. The opposed ends of the recesses 100 are each provided with upwardly and diverging cam sides 102, 104 the function of which will be explained in detail below. A bracket 106 has pivotally secured thereto at 108 one end of a handle 110 which is pivotally connected at 112 to the band 94 whereby the swinging movement of the handle 110 will cause a substantially circular movement of the band 94 to effect a raising of the latch members 90 from within the recesses 100 in order to serve a function to be described infra.

Extending rearwardly from and rigidly secured to the flange 18 are a pair of spaced, confronting and substantially parallel bracket arms 114 which serve as mounting means for an electric motor 116. Also fixedly secured to the flange 18 adjacent each end thereof are a pair of platforms 118 for supporting a pair of journals 120 in which is mounted for rotation a transverse shaft 122. The shaft 122 adjacent one end thereof has fixedly secured thereto for rotation therewith a sprocket 124 connected through an endless chain 126 with a second sprocket 128 rigidly secured to the drive shaft 130 of the motor 116. It is thus seen that the drive shaft 130 is placed in driving relation with the shaft 122.

Figure 4:
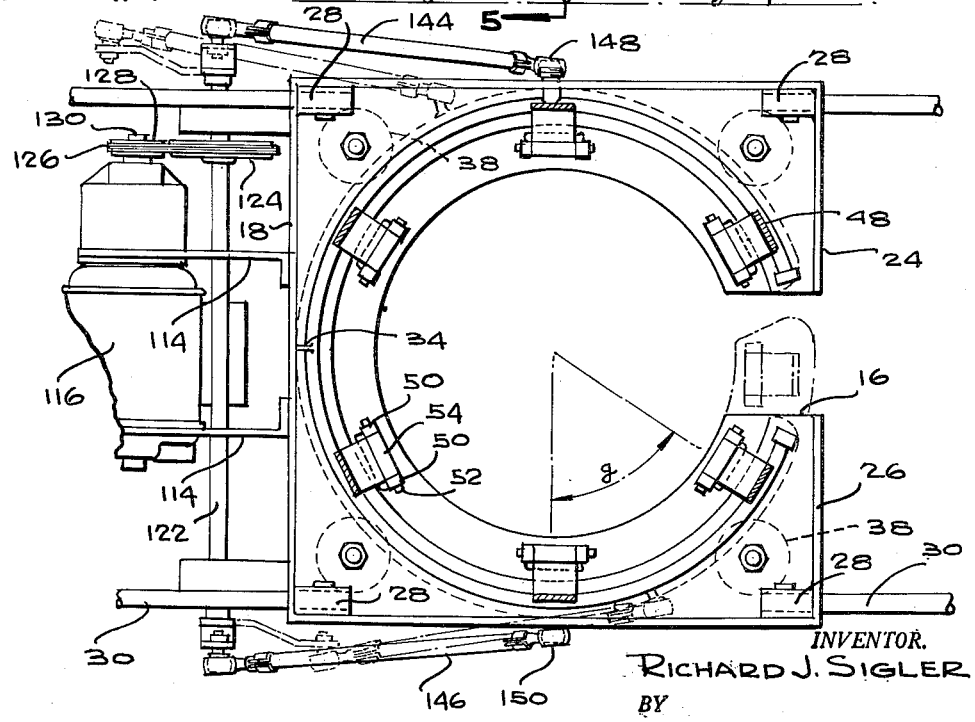
FIGURE 4 is a bottom plan view of the machine illustrated in FIGURE 1, FIGURE 4 being taken substantially on the horizontal plane of line 4—4 of FIGURE 3, looking in the direction of the arrows.

Rigidly secured to the opposed ends of the driven shift 122 are a pair of crank arms 132, 134 which connect through ball and socket joints 136, 138 with stud shafts 140, 142 which are, in turn, fixedly secured within one of the ends of a pair of crank shafts 144, 146. The other ends of the crank shafts 144, 146 connect with the annular ring 42 at diametrically opposed sides thereof through a second pair of ball and socket joints 148, 150. The throw of the crank shafts 144, 146 is such as to cause the annual ring 42 to oscillate between the angles alpha indicated in FIGURE 2 corresponding to the angular movement beta of the ball and socket joints illustrated in FIGURE 7. The oscillatory movement of the ring 42 is also shown in the arrowed line in FIGURE 4 and is indicated at gamma.

The operation of the device illustrated in the several sheets of drawings is described below with special reference being made to FIGURES 1, 2, 3 and 5. These several figures illustrate the machine and its component parts in their respective starting positions.

The opposed pairs of handles or handle members 30 are grasped in the hands of a pair of operators and the machine 10 is moved towards a tree trunk or shrub in such a manner that the same will pass through the slot 16, the slot 44 and between the ends 96, 98 of the band 94. The movement of the machine relative to the tree trunk terminates when the tree trunk is substantially centrally positioned relative to the platform 12. The machine 10 is then lowered to cause the lower pointed ends of the digging blades 48 to engage the immediately adjacent ground 152 (see FIGURE 5), after which one of the operators closes the switch 154 to energize the motor 116. The energization of the motor 116 causes the rotation of the shaft 122 and consequently the eccentric motion of the crank arms 132, 134. This motion is imparted to the crank shafts 144, 146 which are, as has been described above, connected to the annular ring 42 and corresponding movement is imparted thereto. With the ring 42 oscillating, the digging blades 48 connected thereto will trace a corresponding pattern and this oscillatory movement taken in connection with the arcuate configuration of the blades 48 cause the latter to enter into the ground 152 and, because of the arcuate configuration of the blades 48 and their pivotal connection to the ring 42, the blades 48 will tend to pivot from their normally open position as is seen in FIGURES 1, 3 and 5 to a closed position illustrated in FIGURE 6 wherein the free ends of the blades 48 are disposed in substantially contacting engagement one with the others.

Now as the blades 48 move from their open position illustrated in FIGURE 5 to their closed position shown in FIGURE 6, the blades 48 will pivot about the pin 52 in such a manner as to cause the upper ends thereof to move under the latch members 90 (see FIGURE 8) against the tension of the spring 74 until the upper ends of the blades engage in the hook ends 92. This is clearly shown in FIGURE 6 of the drawings. When this condition is obtained the operators of the device may assume that the roots adjacent the tree trunk have been severed and it is only now necessary that the tree together with the ball of earth embraced within the blades 48 be removed from the ground 152.

The tree is then prepared for balling and when thus prepared, one of the operators will grasp the handle 110 and will pull on the same to effect movement of the handle 110 from its dotted line position to its full line position illustrated in FIGURE 9. This movement introduces rotation to the resilient circular band 94 and causes the same to move relative to the hook ends 92 whereby the later are forced to move out of the recess 100 and up one of the two cam sides, 102, 104 thereof. As the latch members 90 are elevated, the hook ends 92 are forced out of engagement with the upper ends of the blades 48 and free the blades 48. The blades 48, under the tension of the spring 74 now rotate about the pins 52 until the upper ends of the blades 48 engage against the adjacent end of the adjusting screw 64 to assume their respective positions illustrated in FIGURES 1, 3 and 5. Upon release of the handle 110 the helicoidal spring 156, having one of its ends secured to the handle 110 above the pivot means 108 and its other end anchored to an adjacent standard 60, causes the latch members 90 to once again engage within the recess 100. Thus the device is prepared for a second operation.

It will be understood that upon the energization of the motor 116 the crank shafts 144, 146 are eccentrically driven to effect oscillatory movement of the annular ring 42 to which they are connected. This is a push-pull connection between the motor and the ring at each side of the device, the arrangement being such that the motion at each side of the annular ring 42 is 180 degrees out of phase relative to each other.

During the digging and root cutting operation, the spray member is connected to a fluid source under pressure to cause the fluid to impinge against the blades 48 to reduce friction and to soften the ground in order to facilitate the operation of the machine.

Under some circumstances it may be desirable to operate the device 10 without using the electric motor 116. This may be easily accomplished by manually oscillating or turning the handles 30 on the platform 12 alternately clockwise and counter-clockwise with the blades 48 engaging the earth. Since the motor 116 is mounted on the platform 12 and also connected to the annular ring 42 (by means of the drive shaft 130, the sprocket 128 thereon, the chain 126 connecting the sprocket 128 to the sprocket 124 on the transverse shaft 122, the crank arms 132, 134 rigidly connected thereon, the ball and socket joints 136 and 138, the stub shafts 140 and 142, and the crank shafts 144 and 146), the annular ring 42 moves with the platform 12 when the motor 116 is not operating.

Therefore, since the handles 30 are thus connected to the ring 42 and the blades 48 therewith, an oscillating or turning of the handles 30 is imparted directly to the annular ring 42 and the blades 48 thereon.

If it is desired to operate the apparatus manually at all times, the motor 116 and the aforesaid structure which connects the motor 116 from the platform 12 to the ring 42 may be omitted, in which case, the ring 42 would be secured to the platform 12 by some other means such as by welding to prevent relative movement between the ring 42 and the platform 12.

Having described and illustrated one embodiment of this invention it will be understood that the same is offered merely by way of example, and that the instant invention is to be limited only by the scope of the appended claims.

What is claimed is:

1. A tree digging machine comprising a substantially rectangular platform having a central aperture formed therein, said platform being provided with a slot extending inwardly from a side thereof and communicating with said opening, an annular ring, means rotatably mounting said annular ring on said platform adjacent one side thereof, said annular ring being coaxially positioned with respect to said aperture, said annular ring having a slot extending inwardly from a side thereof, said first and second slots normally registering with one another to permit a tree trunk to pass therethrough into said aperture and annular ring, a plurality of arcuately shaped earth digging and root cutting blades pivotally mounted on said annular ring intermediate their respective ends, said blades each having end portions projecting beyond one side of said annular ring and digging and root cutting portions projecting beyond the other side thereof and beyond said platform, said digging and root cutting portions being adapted to converge towards each other as said machine is operated, means mounted on said annular ring automatically locking over each of said first end portions of said blades to hold said blades in their converged positions, and means connected to said platform and to said annular ring to effect oscillation of the latter relative to the former.

2. A tree digging machine as defined in claim 1, wherein said locking means comprise a latch member for each of said blades, said latch members being pivotally mounted on said annular ring.

3. A tree digging machine as defined in claim 2 and latch release means operable to disengage said latch members from said blades, said latch release means comprising a substantially circular band mounted on said annular ring below said latch members, means for supporting said circular band ring for movement relative to said annular ring, said ring having a plurality of recesses formed in an edge thereof and having a cam side at each end thereof, said latch means normally engaging within said recesses, and means connected to said annular ring and said band for effecting movement of the latter to cause said cam sides of said recesses to engage below said latch members and elevate the same out of engagement with said blades.

4. A tree digging machine as defined in claim 3, and means mounted on said annular ring constantly biasing said end portions for pivotal movement inwardly of said ring to cause the earth digging and root cutting blades to diverge away from each other upon operation of said latch release means, and means on said annular ring for limiting said last named movement.

5. A tree digging machine as defined in claim 4, and a pair of manually operable pairs of handles fixedly secured to opposed ends of said platform.

6. A tree digging machine as defined in claim 5, and spray means fixedly secured to said rectangular platform, said spray means being directed inwardly of said platform.

7. An apparatus for digging a section of earth or the like, comprising a support having a substantially central longitudinal opening, a plurality of longitudinally curved digging blades mounted on said support for oscillatory movement therewith, means operably connected with said support for enabling said support and said plurality of digging blades to be oscillated for causing said plurality of digging blades to penetrate into the earth to dig a section thereof, pivotal connection means pivotally connecting each of said blades to said support for movement to and from a closed position wherein the ends of said blades are substantially in engagement with each other and an open position wherein such ends are spread apart, and lock means engageable with the upper end of each of said blades for locking said blades in the closed position to retain a section of earth confined therebetween.

8. An apparatus for digging a section of earth comprising: a supporting platform, an annular ring carried by said platform for oscillatory movement with respect thereto, a plurality of longitudinally arcuately curved earth digging and cutting blades carried by said ring and mounted for radial movement with respect thereto whereby the lower ends of said blades may move radially inwardly with respect to the vertical longitudinal axis of said ring and said platform as said ring and platform move downwardly toward the ground, means on said platform maintaining said ring and said platform in coaxial alignment, a power source mounted on said platform, and power transmission means interconnecting said power source and said ring for effecting said oscillatory movement.

9. A machine for excavating a section of earth comprising: a supporting platform, an annular member coaxially carried by said platform for oscillatory movement with respect thereto, a plurality of longitudinally curved digging blades, means mounting said blades circumferentially on said annular member for relative radial movement with respect thereto as the blades move downwardly into the earth, power means operatively associated with said platform and said member to effect the oscillatory movement of the latter with respect to the former, said blades being subject to vertical, radial and oscillatory movement as the supporting platform and member move downwardly toward the ground.

References Cited in the file of this patent

UNITED STATES PATENTS

| | | |
|---|---|---|
| 293,490 | Miles | Feb. 12, 1884 |
| 501,630 | Scott | July 18, 1893 |
| 816,236 | Kline | Mar. 27, 1906 |
| 1,225,188 | Smith | May 8, 1917 |
| 1,270,556 | Scharlie | June 25, 1918 |
| 2,313,604 | Vogel | Mar. 9, 1943 |
| 2,314,567 | Vogel | Mar. 23, 1943 |
| 2,729,493 | Engel | Jan. 3, 1956 |
| 2,769,278 | Wassell et al. | Nov. 6, 1956 |
| 2,775,428 | Monthan | Dec. 25, 1956 |